US009158783B2

(12) United States Patent
Chhaunker et al.

(10) Patent No.: US 9,158,783 B2
(45) Date of Patent: *Oct. 13, 2015

(54) MANAGING REDUNDANT IMMUTABLE FILES USING DEDUPLICATION IN STORAGE CLOUDS

(71) Applicant: INTERNATIONAL BUSINESS MACHINES CORPORATION, Armonk, NY (US)

(72) Inventors: Gaurav Chhaunker, Hyderabad (IN); Bhushan P. Jain, Maharashtra (IN); Sandeep R. Patil, Pune (IN); Sri Ramanathan, Lutz, FL (US); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,740

(22) Filed: Oct. 17, 2014

(65) Prior Publication Data

US 2015/0039570 A1    Feb. 5, 2015

Related U.S. Application Data

(63) Continuation of application No. 13/891,589, filed on May 10, 2013, now Pat. No. 8,892,521, which is a continuation of application No. 13/310,007, filed on Dec. 2, 2011, now Pat. No. 8,468,138.

(51) Int. Cl.
*G06F 7/00* (2006.01)
*G06F 17/00* (2006.01)
(Continued)

(52) U.S. Cl.
CPC ............ *G06F 17/3015* (2013.01); *G06F 7/00* (2013.01); *G06F 17/30* (2013.01);
(Continued)

(58) Field of Classification Search
CPC .......... G06F 17/30156; G06F 11/1453; G06F 3/0641
USPC ........................................................ 707/692
See application file for complete search history.

(56) References Cited

U.S. PATENT DOCUMENTS 6,240,414 B1 * 5/2001 Beizer et al. ......................... 1/1
6,438,560 B1    8/2002 Loen
(Continued)

FOREIGN PATENT DOCUMENTS

CN    101079034    11/2007
CN    101809559     8/2010

OTHER PUBLICATIONS

Carpenter, et al., "Understanding Deduplication", Emerging Technologies, Oct. 6, 2010; 11 Pages.
(Continued)

*Primary Examiner* — Binh V Ho
(74) *Attorney, Agent, or Firm* — Matthew Chung; Roberts Mlotkowski Safran & Cole, P.C.

(57) ABSTRACT

A method includes receiving a request to save a first file as immutable. The method also includes searching for a second file that is saved and is redundant to the first file. The method further includes determining the second file is one of mutable and immutable. When the second file is mutable, the method includes saving the first file as a master copy, and replacing the second file with a soft link pointing to the master copy. When the second file is immutable, the method includes determining which of the first and second files has a later expiration date and an earlier expiration date, saving the one of the first and second files with the later expiration date as a master copy, and replacing the one of the first and second files with the earlier expiration date with a soft link pointing to the master copy.

10 Claims, 7 Drawing Sheets

(51) Int. Cl.
   *G06F 17/30* (2006.01)
   *H04L 29/08* (2006.01)

(52) U.S. Cl.
   CPC ... *G06F 17/30091* (2013.01); *G06F 17/30156* (2013.01); *G06F 17/30194* (2013.01); *G06F 17/30377* (2013.01); *H04L 67/02* (2013.01)

(56) References Cited

U.S. PATENT DOCUMENTS

| | | | |
|---|---|---|---|
| 8,234,317 B1* | 7/2012 | Pogde | 707/821 |
| 2002/0120648 A1* | 8/2002 | Ball et al. | 707/511 |
| 2007/0094231 A1* | 4/2007 | Kim | 707/1 |
| 2007/0111185 A1* | 5/2007 | Krebs | 434/350 |
| 2007/0255758 A1 | 11/2007 | Zheng et al. | |
| 2009/0070740 A1 | 3/2009 | Onodera et al. | |
| 2009/0204649 A1* | 8/2009 | Wong et al. | 707/204 |
| 2009/0216796 A1 | 8/2009 | Slik et al. | |
| 2009/0228599 A1* | 9/2009 | Anglin et al. | 709/231 |
| 2010/0049735 A1 | 2/2010 | Hsu | |
| 2010/0161554 A1 | 6/2010 | Datuashvili et al. | |
| 2010/0198797 A1 | 8/2010 | Wideman | |
| 2010/0306176 A1* | 12/2010 | Johnson et al. | 707/664 |
| 2011/0055171 A1 | 3/2011 | McNutt | |
| 2011/0246741 A1* | 10/2011 | Raymond et al. | 711/170 |
| 2011/0258398 A1* | 10/2011 | Saliba et al. | 711/154 |
| 2012/0271800 A1* | 10/2012 | Tosaka | 707/654 |
| 2012/0287626 A1* | 11/2012 | Kang et al. | 362/235 |
| 2012/0330904 A1* | 12/2012 | Factor et al. | 707/692 |

OTHER PUBLICATIONS

HP Invent, "HP StorageWorks Deduplication and Replication Solution Guide Virtual Library System D2D Backup System", Apr. 2009; 138 Pages.

International Search Report for PCT Application No. PCT/CN2012/081032, dated Dec. 13, 2012; 12 Pages.

IBM, "Advanced Administration Guide", General Parallel File System, IBM, Version 3 Release 3, Sep. 2009, 174 pages.

Mell, P., "The NIST Definition of Cloud Computing", National Institute of Standards of Technology, Information Technology Laboratory, Ver 15, Oct. 7, 2009, pp. 1-2.

* cited by examiner

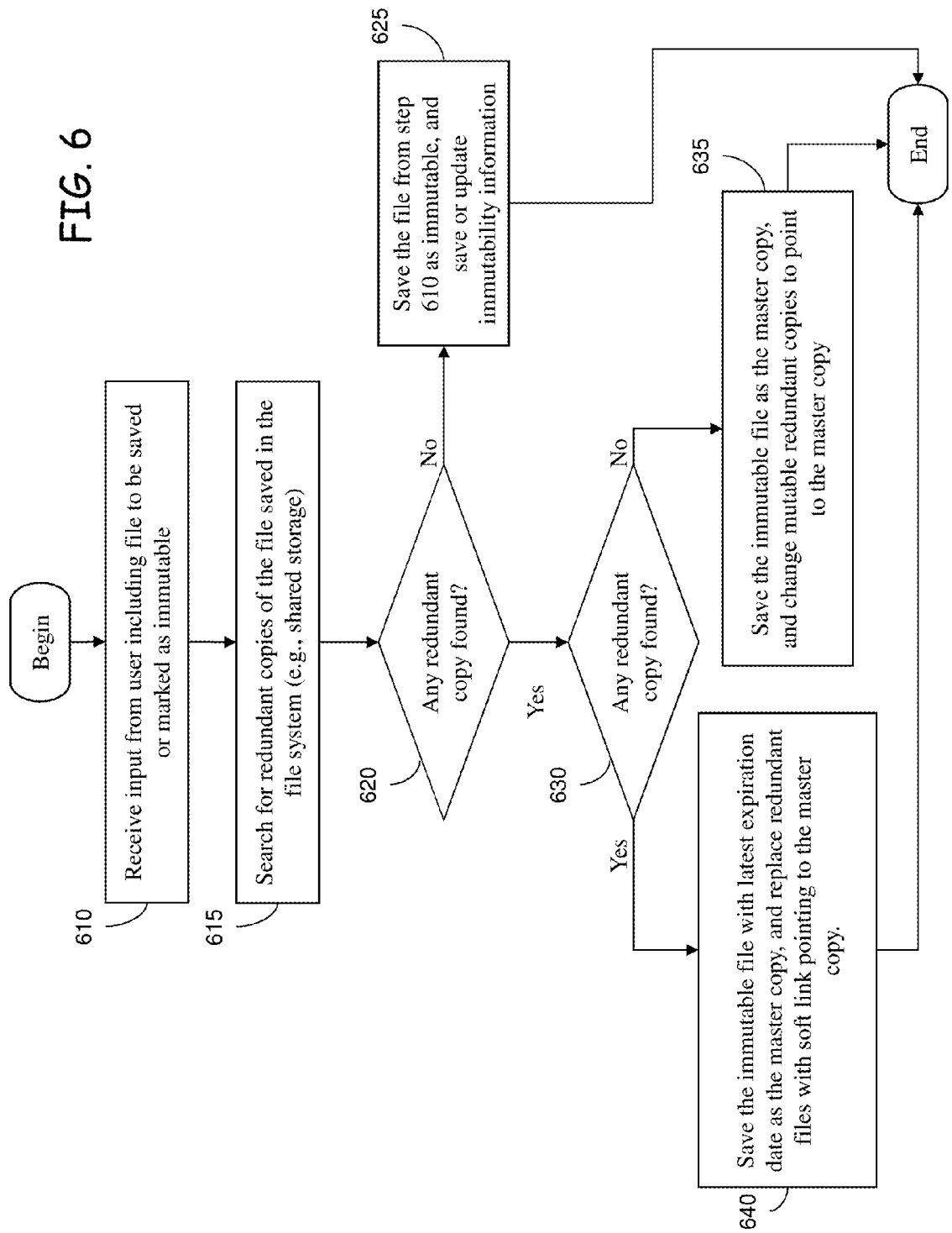

MANAGING REDUNDANT IMMUTABLE FILES USING DEDUPLICATION IN STORAGE CLOUDS

TECHNICAL FIELD

The present invention generally relates to cloud computing and, more particularly, to methods and systems for managing redundant immutable files using deduplication techniques in storage clouds.

BACKGROUND

Information technology is changing rapidly and now forms an invisible layer that increasingly touches nearly every aspect of business and social life. An emerging computer model known as cloud computing addresses the explosive growth of Internet-connected devices, and complements the increasing presence of technology in today's world. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Cloud computing is massively scalable, provides a superior user experience, and is characterized by new, Internet-driven economics. In one perspective, cloud computing involves storage and execution of business data inside a cloud which is a mesh of inter-connected data centers, computing units and storage systems spread across geographies.

With the advent of cloud computing, concepts such as storage clouds have emerged. The storage clouds are a huge network of storage which can be shared by the customers without the need for the customer to manage the storage infrastructure. The storage cloud provider usually has a single large storage space and the provider keeps data from all its customers at the same place, which leads to the concept of multi-tenancy and a multitenant environment. Usually this storage space is shared by the entire customer base on that cloud.

Data deduplication comprises processes to eliminate redundant data. In a deduplication process, duplicate data is deleted leaving only one copy of the data to be stored. In certain situations, indexing of all data is still retained should that data ever be required. Deduplication is able to reduce the effective storage capacity because only unique data is stored. Data deduplication can generally operate at the file or the data block level. File level deduplication eliminates duplicate files, but this is not a very efficient means of deduplication. Block deduplication looks within a file and saves unique iterations of each block or bit. Each chunk of data is processed using a hash algorithm such as MD5 (Message-Digest Algorithm) or SHA-1 (secure hash algorithm). This process generates a unique number for each piece which is then stored in an index. When a file is updated, only the changed data is saved. That is, when only a few bytes of a document or presentation are changed, only the changed blocks or bytes are saved and the changes do not constitute an entirely new file. Therefore, block deduplication saves more storage space than file deduplication.

Many file systems and storage solutions provide the facility to mark documents and files as immutable, i.e., meaning the content of the files and/or the file itself cannot be deleted or modified for a given amount of time or until some other criterion is met. Typically, such requirements come from the compliance-governed agencies and industries, such as government agencies and the health care sector. Such agencies and industries commonly rely on the telecom industry to help ensure compliance with regulations like the Sarbanes-Oxley Act (SOX), Health Insurance Portability and Accountability Act (HIPAA), Federal Financial Institutions Examination Council (FFIEC), etc., which mandate immutable persistence of a given set of files.

For example, in HIPAA's Security Rule (e.g., the Technical Safeguard section), the security logs consisting of incidences are supposed to be preserved for six years in an immutable fashion. This indicates that any file marked immutable is of high importance or of critical value (at least for the given period of time) and hence it is vital to preserve it reliability. The telecom industries have to ensure compliance to these regulations by following the rules to maintain the communication records like the voice calls made and text messages sent. The telecom industries in turn exploit the immutable file feature from their infrastructure to deal with the record immutability requirements for these regulations. This feature is also supported in the IBM® General Parallel File System™ (GPFS™) which is a strategic clustered file system being used in many storage offerings and solutions. (IBM, General Parallel File System, and GPFS are trademarks of International Business Machines Corporation registered in many jurisdictions worldwide).

When data deduplication is done at the file level, the duplicate copies of the file are deleted and only single copy is maintained and all other references point to this single copy. However, this conflicts with the basic premise of immutability that the files cannot be edited or deleted. Thus, the deduplication process is not able to delete redundant copies of immutable files. For example, when there is a need to maintain immutable records of calls and text messages which typically involve more than one party, the telecom industries typically maintain plural copies of the same file in order to comply with the immutability requirements, even though this consumes extra data storage space and increases the management and data protection overhead. In a particular example of a conference call among ten participants in which the call record has a storage size of 1 GB, the telecom provider stores the same record for each participant and maintains immutability over all of the records, thereby consuming a total of 10 GB of space. If the files were not immutable, the deduplication process could delete nine copies of the file and maintain a single copy occupying just 1 GB of space reducing the effective used storage space by 9 GB. However, in some situations, the immutable property of the files prevents such deduplication.

SUMMARY

In a first aspect of the invention, a method of file deduplication implemented in a computer infrastructure comprising a combination of hardware and software includes receiving a request to save a first file as immutable. The method also includes searching for a second file that is saved and is redundant to the first file. The method further includes determining the second file is one of mutable and immutable. When the second file is mutable, the method includes saving the first file as a master copy, and replacing the second file with a soft link pointing to the master copy. When the second file is immutable, the method includes determining which of the first and second files has a later expiration date and an earlier expiration date, saving the one of the first and second files with the later expiration date as a master copy, and replacing the one of the first and second files with the earlier expiration date with a soft link pointing to the master copy.

In another aspect of the invention, a system for file deduplication is implemented in hardware and comprises a computer infrastructure operable to: receive a request to save a first file as immutable; determine a plurality of second files that are redundant to the first file; determine each one of the plurality of second files is immutable; identify a file having a latest expiration date from a group comprising the first file and the plurality of second files; save the file having the latest expiration date as a master copy; and replace each file in the group, except for the file having the latest expiration date, with a respective data structure pointing to the master copy.

In an additional aspect of the invention, a computer program product includes a computer usable tangible storage medium having readable program code embodied in the tangible storage medium, the computer program product includes at least one component operable to receive a request to save a first file as immutable in a shared storage, wherein the request is received from a local computing device remote from the shared storage. The at least one component is further operable to identify at least one second file that is saved in the shared storage and is redundant to the first file. The at least one component is further operable to determine the at least one second file is one of mutable and immutable. The at least one component is further operable to, when the at least one second file is mutable, save the first file as a master copy, and replace each of the at least one second file with a respective soft link pointing to the master copy. The at least one component is further operable to, when the at least one second file is immutable: identify a file having a latest expiration date from a group comprising the first file and the at least one second file; save the file having the latest expiration date as a master copy; and replace each file in the group, except for the file having the latest expiration date, with a respective data structure pointing to the master copy.

In a further aspect of the invention, a method of deduplicating files includes providing a computer infrastructure being operable to: receive a request to save a first file as immutable in a shared storage, wherein the request is received from a local computing device remote from the shared storage; determine a plurality of second files that are redundant to the first file; determine a first subset of the plurality of second files is mutable; determine a second subset of the plurality of second files is immutable; identify a file having a latest expiration date from a group comprising the first file and the second subset; save the file having the latest expiration date as a master copy; and replace each file in the group, except for the file having the latest expiration date, with a respective soft link pointing to the master copy.

In another aspect of the invention, a computer system for deduplicating files includes a CPU, a computer readable memory and a computer readable storage media. The system includes first program instructions to receive a request to save a first file as immutable in a shared storage, wherein the request is received from a local computing device remote from the shared storage. The system includes second program instructions to determine a plurality of second files that are immutable and redundant to the first file. The system includes third program instructions to identify a file having a latest expiration date from a group comprising the first file and the plurality of second files. The system includes fourth program instructions to save the file having the latest expiration date as a master copy. The system includes fifth program instructions to replace each file in the group, except for the file having the latest expiration date, with a respective data structure pointing to the master copy. The first, second, third, fourth and fifth program instructions are stored on the computer readable storage media for execution by the CPU via the computer readable memory. The determining the plurality of second files that are immutable and redundant to the first file comprises: determining at least one candidate redundant file by comparing a hash value of the first file to hash values of other files saved in the shared storage; and comparing the first file to the at least one candidate redundant file using a file diff process.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 6 depicts an exemplary flow diagram in accordance with aspects of the invention.

DETAILED DESCRIPTION

Figure 1:
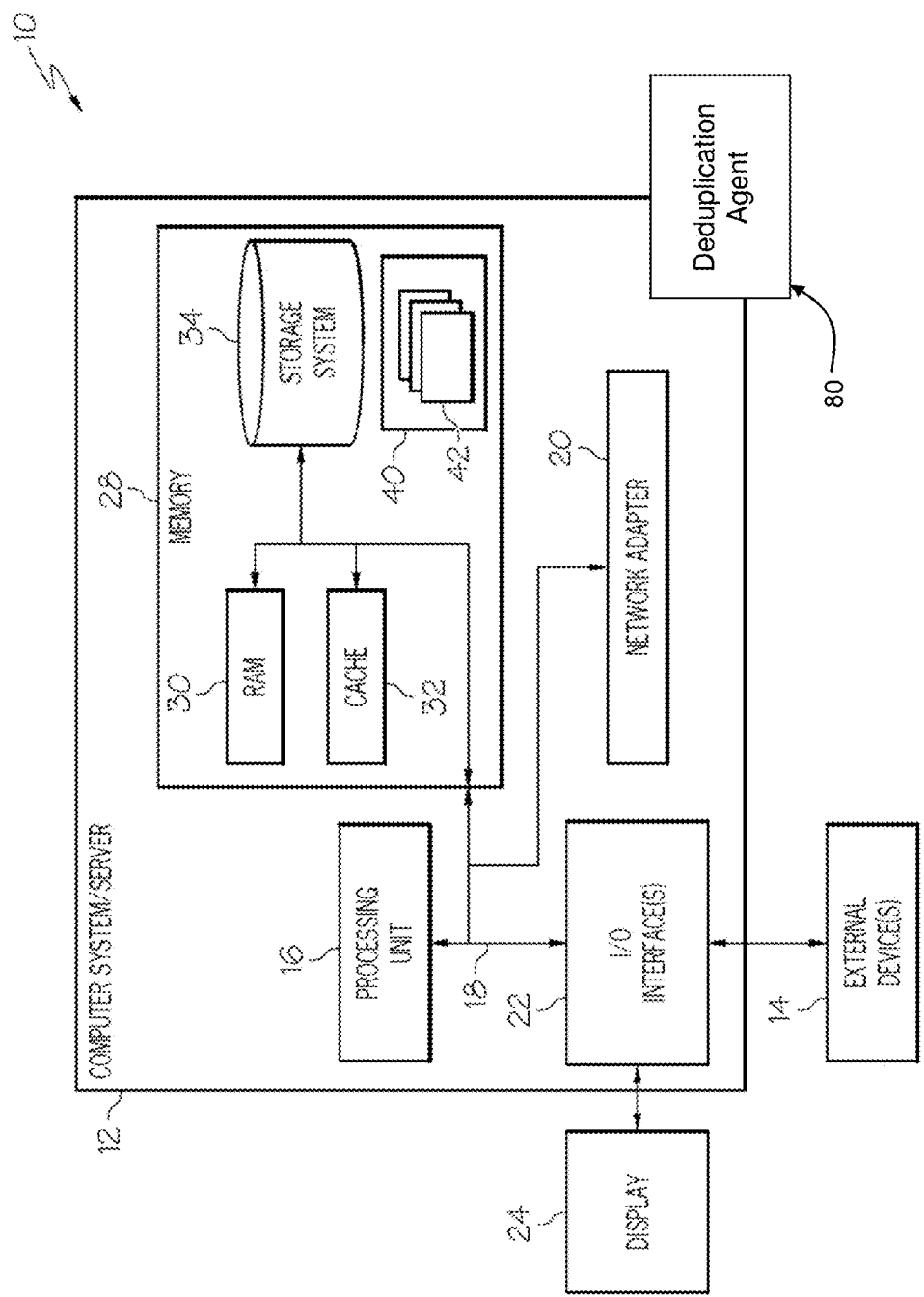
FIG. 1 depicts a cloud computing node according to aspects of the present invention.

The present invention generally relates to cloud computing and, more particularly, to methods and systems for managing redundant immutable files using deduplication techniques in storage clouds. In accordance with aspects of the invention, deduplication techniques are applied to immutable files to achieve data storage savings while maintaining the immutable premise. In embodiments, in situations where there are plural redundant immutable files, the file with an expiration date farthest in the future is set as the master copy and saved, and all other redundant copies are set to point to the master copy and deleted. In this manner, implementations of the invention achieve the data storage savings of deduplication by deleting redundant copies of files, and also provide access to a copy of an immutable file for users with an immutability requirement.

In accordance with aspects of the invention, when a particular file is marked as immutable, a deduplication agent proactively searches for other files that are redundant to the immutable file. When a mutable (e.g., not immutable) redundant file is found, the deduplication agent deletes the mutable file and points it to the immutable file which is saved as the master copy. When an immutable redundant file is found, the deduplication agent compares the immutability expiration dates of the plural immutable files (e.g., the original and the one or more found by the deduplication agent) and saves the immutable file with the latest expiration date as the master copy. The deduplication agent deletes all other immutable redundant files and points these files to the master copy.

In embodiments, the deduplication agent retains the immutability attributes (e.g., expiration date) of each immutable file with a soft link. For example, for a particular file that has been deleted and which now points to a master copy, the soft link of the particular file contains the path (e.g., pointer) to the master copy as well as the immutability attributes (e.g., expiration date) of the particular file. In this manner, although the redundant copy of the immutable file is deleted, the immutability attributes (e.g., expiration date) of the deleted file are retained and the owner of the deleted copy has access to the master copy. As such, redundant copies of the master file are eliminated without violating the immutability premise. Furthermore, in the event that the immutability period of a master copy expires (e.g., the expiration date occurs) and a soft link pointing to the master copy has a later expiration date, the deduplication agent promotes the soft link as the master copy and changes the existing master copy to a soft link that is no longer immutable.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a deduplication agent 80 as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of the deduplication agent 80 may be implemented as one or more of the program modules 42. Additionally, the deduplication agent 80 may be implemented as separate dedicated processors or a single or several processors to provide the functionality described herein. In embodiments, the deduplication agent 80 performs one or more of the processes described herein, including but not limited to: receiving a file to be saved as immutable in a shared storage, or receiving an indication that a file currently saved in shared storage is to be set as immutable; finding redundant copies of the file in the file system; deleting redundant mutable copies found in the file system and pointing these redundant mutable copies to the immutable file as a master copy; comparing redundant immutable copies found in the file system to the immutable file, saving one of the files as a master copy, pointing the other files to the master copy with a soft link, and deleting the other files.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
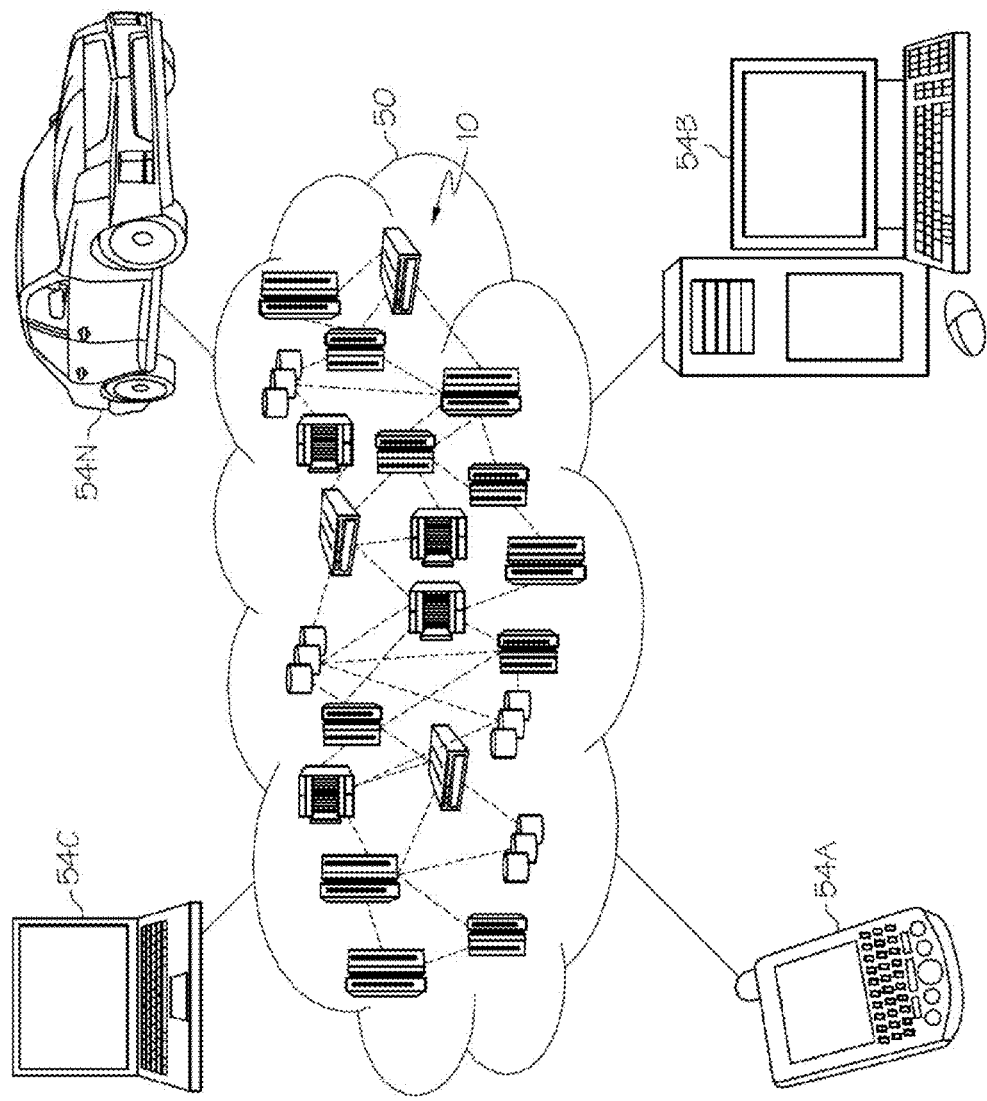
FIG. 2 depicts a cloud computing environment according to aspects of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
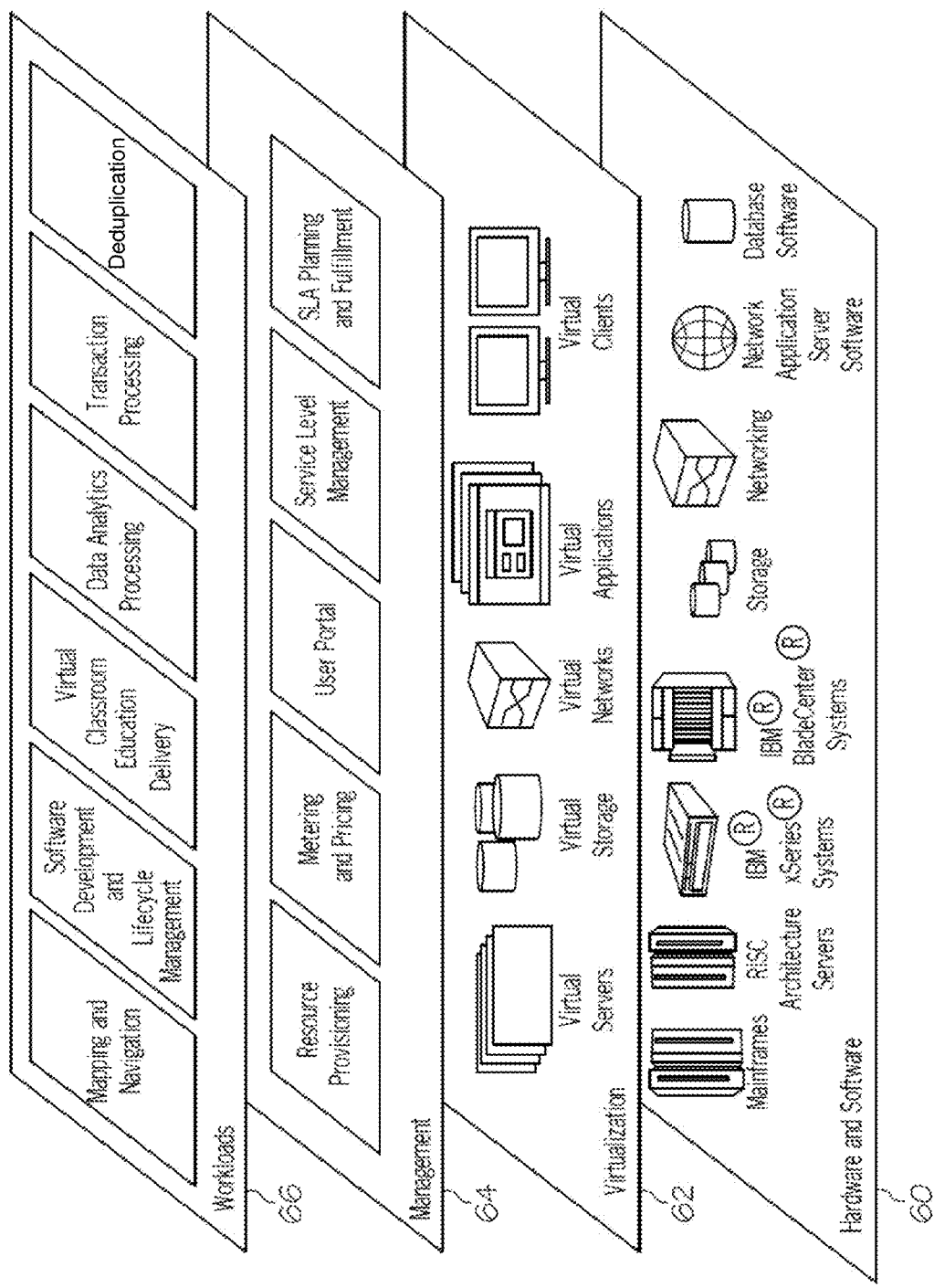
FIG. 3 depicts abstraction model layers according to aspects of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and deduplication. In accordance with aspects of the invention, the deduplication workload/function operates to perform one or more of the processes described herein, including but not limited to: receiving a file to be saved as immutable in a shared storage, or receiving an indication that a file currently saved in shared storage is to be set as immutable; finding redundant copies of the file in the file system; deleting redundant mutable copies found in the file system and pointing these redundant mutable copies to the immutable file as a master copy; comparing redundant immutable copies found in the file system to the immutable file, saving one of the files as a master copy, pointing the other files to the master copy with a soft link, and deleting the other files.

As will be appreciated by one skilled in the art, aspects of the present invention, including the deduplication agent 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
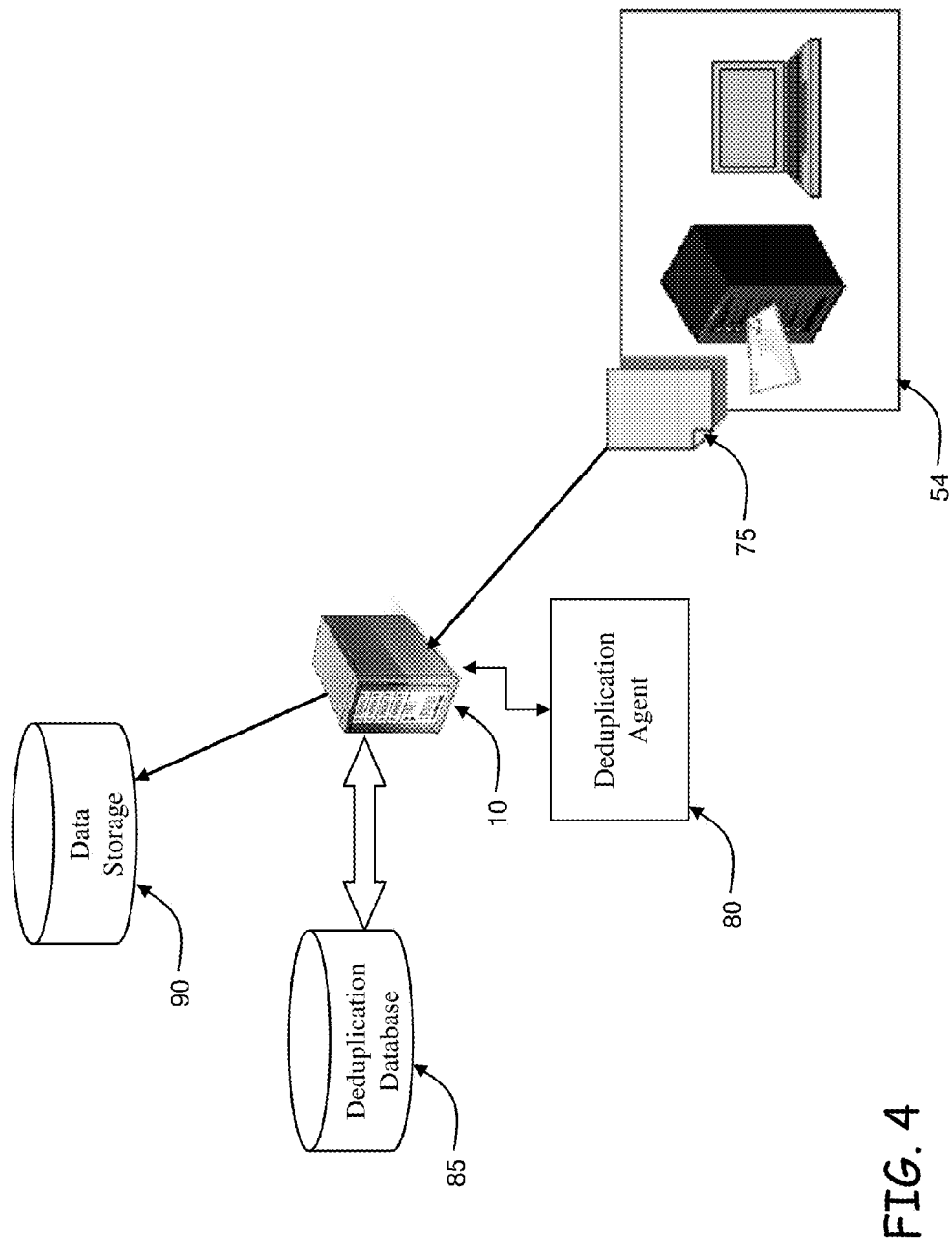
FIG. 4 depicts a data deduplication block diagram.

FIG. 4 depicts a deduplication block diagram in accordance with aspects of the invention. In embodiments, data in the form of an immutable file 75 flows from a local computing device 54 to a deduplication system comprising computing node 10 and deduplication agent 80. This may comprise, for example, the user of the local computing device 54 requesting (or instructing) that the file 75 be saved as immutable in shared storage 90 or designating that the file 75 currently saved in shared storage 90 be designated as immutable. The local computing device 54 may be one of many local computing devices 54A-N described above with respect to FIG. 2. The shared storage 90 may be, for example, one or more data storage elements contained at one or more nodes in a cloud environment such as cloud environment 50 depicted in FIG. 2.

In a file deduplication process, the deduplication agent 80 runs a hash algorithm against the file 75 that generates a unique hash value for the file. The deduplication agent 80 compares the unique hash value for the file to hash values of other files already stored in storage 90. The hash values of the other files may be stored in the storage 90 and/or in a deduplication database 85 that contains information about deduplicated files in the system. The deduplication agent 80 determines redundant files by comparing the various hash values and indentifying matching hash values.

In additional embodiments, the comparing and matching of hash values is a first step in determining redundancy. In such additional embodiments, files with matching hash values are deemed probable (e.g., candidate) redundant copies. A second step for confirming redundancy involves the deduplication agent 80 performing a file diff process among the probable redundant copies to increase the confidence that the copies are identical. The file diff process compares the actual contents of the files as opposed to comparing hash values. In this manner, the deduplication agent 80 may additionally use a file diff process to identify true redundant copies, e.g., files in storage 90 that are identical to file 75.

Comparing hash values and optionally performing a file diff process are exemplary methods of determining redundant files. The invention is not limited to these methods, however, and any suitable comparison process to identify files stored in storage 90 that are identical to file 75 may be used within the scope of the invention.

In accordance with aspects of the invention, in the event the deduplication agent 80 fails to find any files in storage 90 that are redundant to file 75, the deduplication agent 80 saves the file 75 in storage 90 and retains the immutability attributes of the file 75 in the inode of the file. On the other hand, when the deduplication agent 80 does find at least one file in storage 90 that is redundant to file 75, then the deduplication agent 80 applies a deduplication process to the redundant files based on whether found copies of the file are mutable or immutable, as described in more detail below with respect to FIGS. 5A and 5B.

Figure 5A:
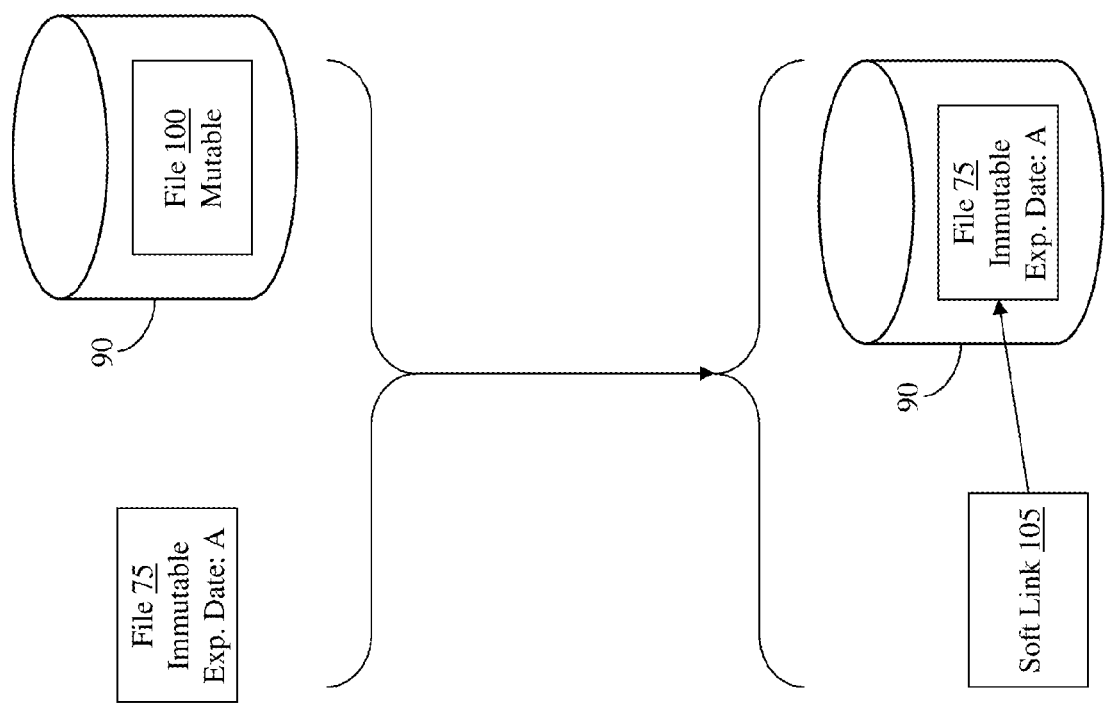
FIGS. 5A and 5B depict exemplary deduplication processes in accordance with aspects of the invention.

FIG. 5A depicts a deduplication process in accordance with aspects of the invention when the file 75 is immutable and the agent (e.g., agent 80 described in FIG. 4) finds one or more mutable redundant files 100 in storage 90. In this case, the found redundant file 100 is mutable meaning that there are no restrictions on this file 100 being deleted, modified, etc. Accordingly, the agent saves file 75 in storage 90 and designates file 75 as a master copy. The agent deletes file 100 from storage 90 and creates a soft link 105 that points to the master copy, e.g., file 75. The soft link 105 may be a data structure stored in any suitable location in the file system, including but not limited to the storage 90, a deduplication database (e.g., database 85 described in FIG. 4), as part of an inode, or other location in the file system.

Still referring to FIG. 5A, the agent may identify more than one mutable redundant file 100 saved in storage 90. In such cases, each one of the plural mutable files 100 is deleted from storage 90 and replaced with a respective soft link 105 pointing to the file 75 (e.g., the master copy saved in storage 90).

Additionally, the immutable file 75 may have an expiration date 'A'. The file 75 may be deleted or modified on or after the expiration date, in which case the agent promotes the soft link 105 to the master copy in the storage 90. When there are plural soft links 105 pointing to file 75 when file 75 is modified or deleted after the expiration date, the agent promotes one of the soft links 105 to a new master copy and updates the remaining plurality of the soft links 105 to point to the new master copy.

In the event the owner of the mutable file 100 deletes the file after the creation of the soft link 105, the agent deletes the soft link 105 while retaining the master copy of file 75 saved in storage 90. In the event the owner of the mutable file 100 updates the file after creation of the soft link 105, the agent performs a conventional deduplication process of creating a new copy of the master file, receiving the user changes to the new copy, and saving the new copy as a new file (e.g., copy on write).

Figure 5B:
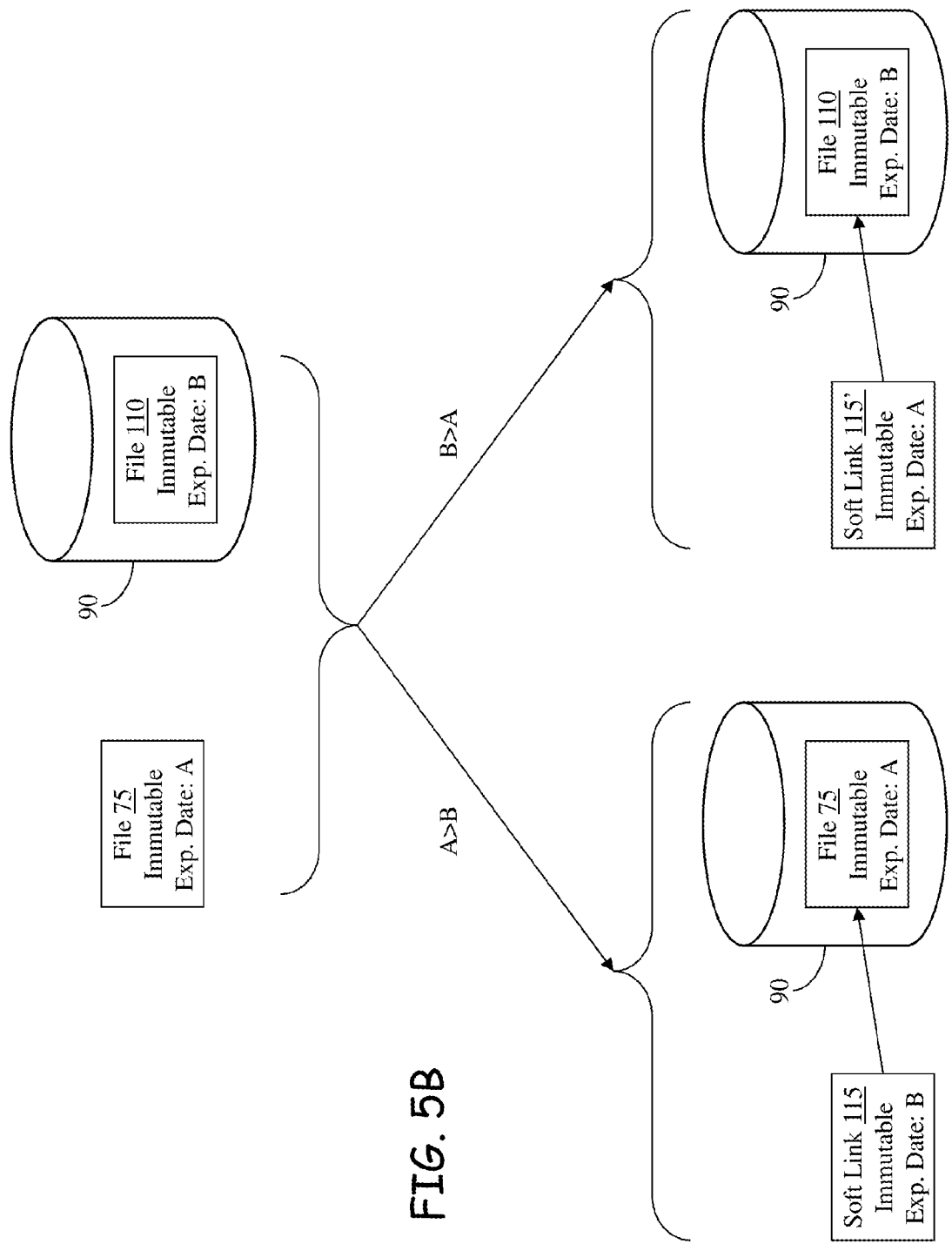

FIG. 5B depicts a deduplication process in accordance with aspects of the invention when the file 75 is immutable and the agent (e.g., agent 80 described in FIG. 4) finds one or more immutable redundant files 110 in storage 90. In the example shown in FIG. 5B, file 75 has an immutability expiration date of 'A' and file 110 has an immutability expiration date of 'B'. When A is greater than B (e.g., file 75 is immutable longer into the future than file 110), then file 75 is saved in the storage 90 as a master copy, and file 110 is deleted and replaced with a soft link 115 pointing to the master copy. On the other hand, when B is greater than A (e.g., file 110 is immutable longer into the future than file 75), then file 110 is saved in the storage 90 as a master copy, and file 75 is deleted and replaced with a soft link 115' pointing to the master copy. In either event (A>B or B>A), one file is saved in storage 90 as a master copy and the other file is deleted and replaced with a soft link pointing to the master copy. Moreover, the soft link (e.g., soft link 115 or 115') that replaces the deleted file contains data defining the immutability expiration date of the deleted file, in addition to containing data defining the path (e.g., pointing) to the master file.

The processes depicted in FIG. 5B may be performed when the agent identifies more than one file 110 that is redundant to file 75. In such a case, the agent determines which file of all files 75 and 110 has the farthest expiration date in the future, and promotes and saves that one file as the master copy in storage 90. The remaining files are deleted and replaced with soft links 115 and/or 115' as already described.

In embodiments, when one of the soft links expires prior to the master copy, the agent deletes the particular soft link or changes the soft link to mutable while retaining the saved master copy and any other soft links. On the other hand, when the master copy expires, the agent analyzes the expiration dates of all of the soft links pointing to the master file to determine whether any of the soft links have an expiration date in the future (which may happen, for example, when a soft link is altered to extend its expiration date to a date after the expiration date of the master copy). When no soft links have a later expiration date, the master copy and all soft links may be deleted or changed to mutable. When only one soft link has a later expiration date, that soft link is promoted to the master copy, and the previous master copy and all other soft links are deleted or changed to mutable. When plural soft links have a later expiration date, the soft link with the latest expiration date is promoted to the master copy, the other soft links having an expiration date in the future are changed to point to the new master copy, and the previous master copy and all other soft links whose expiration date has passed are deleted or changed to mutable.

The soft link (e.g., soft link 105, 115, 115') is not limited to storing immutability information in the form of an expiration date, and alternative or additional immutability information may be stored in the soft link within the scope of the invention. Moreover the determination of which file to promote and save as the master copy and which file(s) to delete and replace with a soft link may be based on immutability information other than an expiration date.

Flow Diagram

FIG. 6 shows an exemplary flowchart for performing aspects of the present invention. The steps of FIG. 6 may be implemented in any of the environments of FIGS. 1-4, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 6 depicts an exemplary flowchart for a deduplication process in accordance with aspects of the present invention. At step 610, a deduplication system (e.g., a computing device running the deduplication agent 80) receives input from a user (e.g., local computing device 54), the input comprising an indication of a file that is to be set as immutable. The user input may comprise the file being transmitted to the deduplication system from the local computing device with instruction to save the file as immutable in a shared storage (e.g., storage 90). Alternatively, the user input may comprise an identification of an already saved file (e.g., already saved in storage 90) and an instruction to designate the file as immutable.

At step 615, the deduplication system searches for redundant copies of the file currently stored in the file system (e.g., in storage 90). In embodiments, this is performed in the manner described with respect to FIG. 4. For example, a deduplication agent of the deduplication system may generate a hash value for the file (e.g., the file from step 610) and compare this hash value to hash values of files stored in the file system. Matching hash values indicate redundant copies of files. Optionally, the deduplication agent may additionally or alternatively perform a file diff process on probable (e.g., candidate) redundant files to increase the confidence that files found at step 615 are identical to the file from step 610.

At step 620, the deduplication system determines whether any redundant copies are found, e.g., using the results of the searching and comparing from step 615. When no redundant copies are found, then at step 625 the deduplication system saves the file (from step 610) and its associated immutability information in the file system (e.g., storage 90) and/or updates any new immutability information associated with the file and received at step 610. On the other hand, when there are redundant copies found at steps 615 and 620, then the process proceeds to step 630 where the deduplication system determines whether the redundant copies are mutable or immutable. In embodiments, the determination of whether a particular file is immutable or mutable is made by examining attributes of the particular file in a conventional manner.

When the one or more redundant copies are determined to be mutable at step 630, then at step 635 the immutable file (from step 610) is saved in the shared storage as a master copy, and all mutable redundant copies are deleted and replaced with a soft link that points to the master copy. In embodiments, step 635 comprises saving the immutable file as the master copy, updating immutability information for the master file, and changing mutable redundant copies to point to the master copy. This may be performed as described above with respect to FIG. 5A.

On the other hand, when one or more of the redundant copies are determined to be immutable at step 630, then at step 640 the deduplication system determines which of all the files (e.g., the file from step 610 and the redundant files found at step 615) has the latest expiration date (e.g., the immutability expiration date farthest in the future). The file with the latest expiration date is saved in the shared storage as a master copy, and all other files from the group consisting of the file from step 610 and redundant files from steps 615 and 620, except for the file saved as the master copy, are deleted and replaced with a soft link that points to the master copy. In embodiments, step 640 comprises determining which immutable file has latest expiration date, saving the immutable file with latest expiration date as the master copy, replacing redundant files with a soft link pointing to the master copy, saving immutability information in the soft link. This may be performed as described above with respect to FIG. 5B.

There is the possibility that the deduplication system finds a plurality of redundant files at step 615, some of which are mutable and some of which are immutable. In such an event, the deduplication system deduplicates the mutable files as described at step 635 and separately deduplicates the immutable files as described at step 640.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed:

1. A system for file deduplication implemented in hardware and comprising a computer infrastructure comprising at least one computer device operable to:
    receive, by the at least one computer device, a request to save a first file as immutable;
    determine, by the at least one computer device, a plurality of second files that are redundant to the first file;
    determine, by the at least one computer device, each one of the plurality of second files is immutable;
    identify, by the at least one computer device, a file having a latest expiration date from a group comprising the first file and the plurality of second files;
    save, by the at least one computer device, the file having the latest expiration date as a master copy; and
    replace, by the at least one computer device, each file in the group, except for the file having the latest expiration date, with a respective data structure pointing to the master copy.

2. The system of claim 1, wherein the respective data structure comprises an immutability expiration date.

3. The system of claim 1, wherein the respective data structure comprises a soft link comprising an immutability expiration date.

4. The system of claim 1, wherein the request to save the first file comprises a request or instruction to save the first file in a shared storage.

5. The system of claim 4, wherein:
    the request to save the first file is received from a local computing device;
    the shared storage is in a cloud environment remote from the local computing device; and
    the master copy is saved in the shared storage.

6. The system of claim 1, wherein the determining the plurality of second files that are redundant to the first file comprises comparing a hash value of the first file to hash values of other saved files.

7. The system of claim 1, wherein the at least one computer device is further operable to one of delete the master copy and mark the master copy as mutable upon reaching the latest expiration date.

8. The system of claim 7, wherein the at least one computer device is further operable to:
    determine a soft link having a new latest expiration date from a plurality of soft links pointing to the master copy; and
    promote the soft link having the new latest expiration date as a new master copy; and
    update the plurality of soft links, other than the soft link having the new latest expiration date, to point to the new master copy.

9. The system of claim 1, wherein the at least one computer device comprises:
    one or more computer processors;
    a computer readable hardware storage device; and
    program instructions stored on the computer readable hardware storage device for execution by the one or more computer processors.

10. A computer program product comprising a computer readable hardware storage device having readable program code stored on the computer readable hardware storage device, the program code comprising:
    program code to receive a request to save a first file as immutable in a shared storage, wherein the request is received from a local computing device remote from the shared storage;
    program code to identify at least one second file that is saved in the shared storage and is redundant to the first file;
    program code to determine the at least one second file is one of mutable and immutable;
    program code to, when the at least one second file is mutable, save the first file as a master copy, and replace each of the at least one second file with a respective soft link pointing to the master copy; and
    program code to, when the at least one second file is immutable: identify a file having a latest expiration date from a group comprising the first file and the at least one second file; save the file having the latest expiration date as a master copy; and replace each file in the group, except for the file having the latest expiration date, with a respective data structure pointing to the master copy.

* * * * *